United States Patent [19]

Thomas et al.

[11] Patent Number: 4,938,496
[45] Date of Patent: Jul. 3, 1990

[54] BALL HITCH APPARATUS

[76] Inventors: Charles B. Thomas, 29323 S. Gibraltar, Gibraltar, Mich. 48173; Arnal Staggs; Margarita C. Flores, both of 1155 Lincoln, Wyandotte, Mich. 48192

[21] Appl. No.: 297,174

[22] Filed: Jan. 17, 1989

[51] Int. Cl.⁵ .............................................. B60D 1/06
[52] U.S. Cl. .................................... 280/511; 403/194; 403/324; 403/328
[58] Field of Search ................. 280/511, 416.1, 415.1, 280/512, 513; 403/131, 324, 328, 194, 198

[56] References Cited

U.S. PATENT DOCUMENTS

| | | | |
|---|---|---|---|
| 1,977,065 | 10/1934 | Jacob | 280/512 |
| 2,768,848 | 10/1956 | Mitchell et al. | 280/511 |
| 3,782,762 | 1/1974 | Nagy et al. | 280/511 |
| 3,876,242 | 4/1975 | Eaton | 280/511 |
| 4,232,877 | 11/1980 | Milton | 280/416.1 |
| 4,433,854 | 2/1984 | Smith | 403/328 |
| 4,522,421 | 6/1985 | Vance | 403/131 |
| 4,596,406 | 6/1986 | Van Vleet et al. | 280/511 |
| 4,772,039 | 9/1988 | Cook | 280/511 |

FOREIGN PATENT DOCUMENTS

| | | | |
|---|---|---|---|
| 474765 | 6/1951 | Canada | 280/511 |
| 741207 | 11/1955 | United Kingdom | 280/513 |
| 2195967 | 4/1988 | United Kingdom | 280/511 |

Primary Examiner—Charles A. Marmor
Assistant Examiner—Anne Marie Boehler
Attorney, Agent, or Firm—Weintraub, DuRoss & Brady

[57] ABSTRACT

The present invention is a ball hitch connector for use with a conventional ball hitch socket. The ball hitch connector includes a spherical body having a polygonally shaped bore to receive a generally cylindrical stud, where the upper section of the stud has a polygonal shape complimentary to the bore of the spherical body. The stud attaches to a generally conical collar, by means of a latch pin through two bored holes, one located in the lower section of the stud and one located in the base of the collar. The stud and attached collar are insertable within a base plate. The base of the collar is polygonal in shape. The base plate is a ring which has an inner cavity of corresponding shape to the collar. The collar and attached stud are held in place by means of the complimentary configured base plate cavity. The stud is secured to the base plate by a fastening means such as a nut and washer.

10 Claims, 1 Drawing Sheet

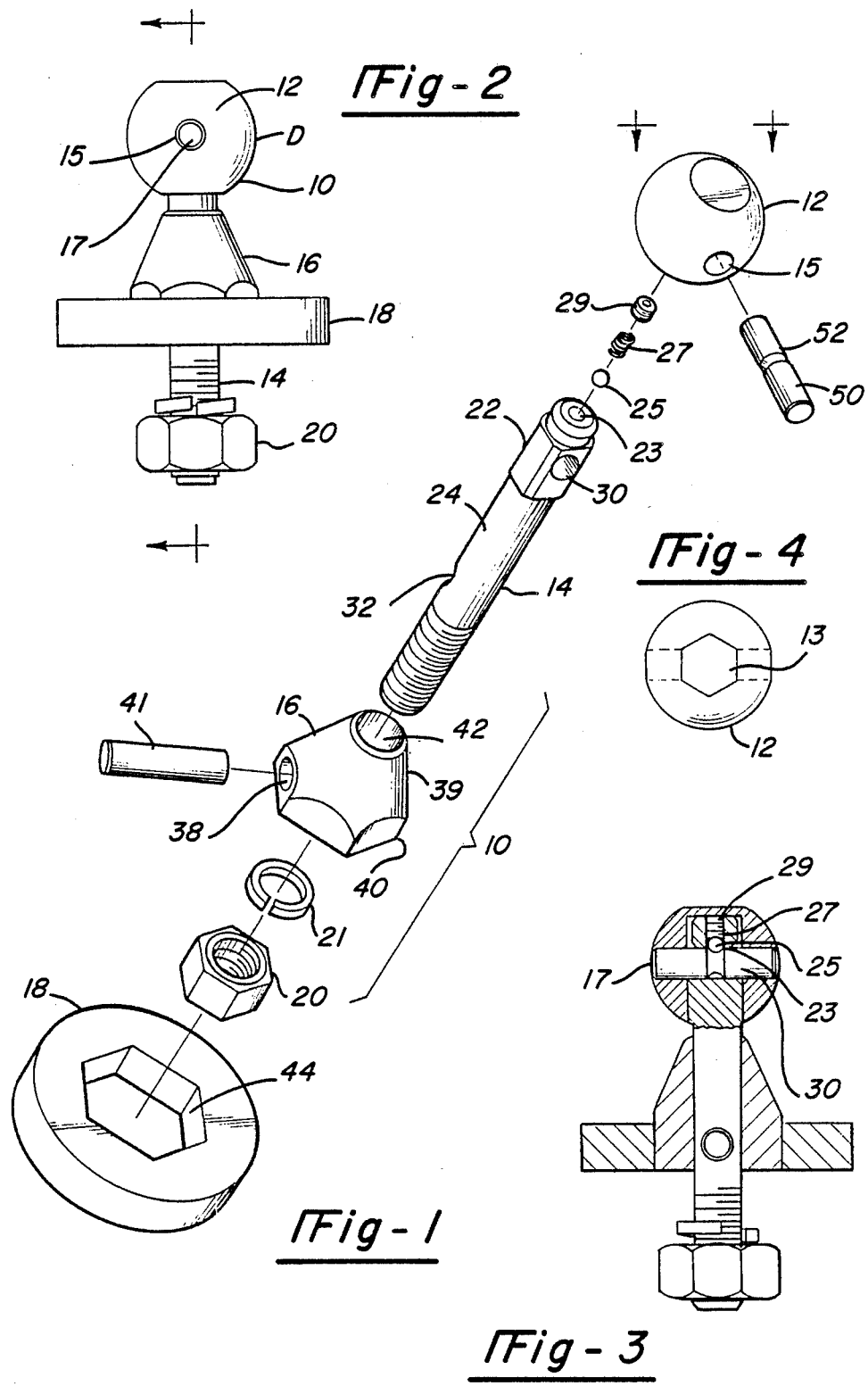

BALL HITCH APPARATUS

BACKGROUND OF THE INVENTION

1. Field of the Invention

The present invention relates to a ball and hitch apparatus. More particularly, the invention relates to an apparatus having a quick change ball connector and removable and rotatable stud attached to the ball connector.

2. Prior Art

Generally, the prior art teaches a multitude of ball hitch connectors or ball hitches for use with a ball hitch socket for connecting a vehicle to be towed, such as a trailer, to a towing vehicle, such as a car, truck or tractor. Typically, a conventional ball and socket-type hitch usually includes a spherical body also referred to as a ball connector or ball, that is adapted for attachment to a draw bar or tow bar of a towing vehicle. The tongue or hitch of the trailer or other vehicle to be towed is equipped with a socket adapted to fit over the spherical body or ball connector and includes movable and lockable jaws adapted to tighten under the spherical body to prevent the socket from being removed therefrom during towing operations. Such ball and socket hitch devices are relatively safe; they are easy to connect and disconnect, and they provide a hitch connection in which the tongue or hitch of the towed vehicle can pivot to a considerable extent in any plane about the hitch connection point. However, as the art has developed there have been many improvements in this basic concept.

For example, the prior art teaches ball and socket hitches with interchangeable ball connectors. This allows the ball to be changed to fit variable size sockets on the hitch or tongue of the vehicle to be towed. An interchangeable ball hitch of this type is taught in U.S. Pat. No. 4,596,406 to Van Vleet. In the Van Vleet patent, the spherical body is held onto a connector which includes a support base which has an upwardly extending stub shaft. The stub shaft has a bore extending inwardly from an outer surface of the stub shaft. The ball hitch connector is held in place on the shaft by means of a latch pin which is insertable through the bore of the stub shaft. The ball hitch socket is then positioned over the spherical body to hold the latch pin in a locked position.

In U.S. Pat. No. 4,433,324 to Smith, there is disclosed an internally releasable attachment mechanism to releasably attach a ball connector to a support base. The releasable attachment mechanism includes a latch pin slidably positioned in a transverse bore and biased outwardly by a spring positioned in the bore behind the latch pin.

It is to be thusly, appreciated the prior art has addressed the problem of a replaceable spherical body or ball for a ball and hitch apparatus, in the event that the spherical body is an improper size, or demonstrates improper wear. However, the problems of securely fastening the spherical body to a central stud in such a manner as to provide additional security in the event that the pin fastening the spherical body to the stud is lost or broken is not readily addressed in the prior art. By the same token the prior art fails to teach the utilization of the shape of the bore of the spherical body and stud as an additional safety or security factor.

Furthermore, no provision is made in the prior art for incremental rotation of the ball hitch assembly for wear resulting at the base of the assembly. It is this to which the present invention is directed.

SUMMARY OF THE INVENTION

In accordance with the present invention there is provided a ball hitch connector assembly which, generally, comprises:

(a) a generally spherical body or ball adapted to seat and interconnect with a shaft, the spherical body including a first polygonally shaped opening and a throughbore which connects with the polygonal opening;

(b) a stud or shaft comprising:
  (1) a first polygonally shaped end which projects into the spherical body through the first polygonal shaped opening of the first end having a through bore which registers with the throughbore of the spherical body;
  (2) a medial or middle portion or section having a second transverse bore formed therethrough; and
  (3) a lower portion or section which receives a fastener or closure to secure the shaft to a drawbar or the like;

(c) means for releasably retaining the first end of the stud in the spherical body;

(d) a collar mountable onto the stud for securing the shaft to a base plate; and (e) a base place secured onto a drawbar or the like and which receives the collar.

The spherical body or ball throughbore is positioned to align itself with the throughbore of the stud when the stud is inserted into the first opening or bore of the spherical body.

Located within the upper section of the stud is a compartment which encloseures a ball and spring assembly which cooperates with a latch pin which projects through the respective throughbores of the ball and the upper portion of the stud to define the means for releasably latching the ball and stud. The ball hitch apparatus further includes a collar, which is generally conical in shape and encircles the stud. The collar comprises an upper section and a base section. The base of the color is polygonal in shape. The collar has a bore extending inwardly from an outer surface of the polygonal base of the collar so as to be in communication with the second through bore of the stud. The inner surface of the collar is cylindrical and receives the stud, the collar being rotatable to align the bore of the stud with the bore of the collar and to thus secure the shaft to the collar with a latch pin or the like. The base plate has the same polygonal shape as the collar, for receiving the stud and attached collar. The base plate cooperates with the collar to retain the latch pin means in the second bore of the stud when the collar is positioned in the base plate. The stud is held in place on the base plate by means of the attached collar and is secured by a fastening means, such as a nut and washer.

The ball hitch apparatus of the present invention is constructed such that it can be mounted on a conventional ball and socket type hitch which is adapted for attachment to a draw bar or tow bar of a towing vehicle. The tongue or hitch of the trailer or other vehicle to be towed is equipped with a socket to fit over the spherical body of the ball hitch apparatus.

For a more complete understanding of the present invention reference is made to the accompanying drawings and detailed description of the preferred embodiment.

BRIEF DESCRIPTION OF THE DRAWINGS

FIG. 1 is an exploded, perspective view of an embodiment of a ball hitch connector in accordance with the principles of the present invention;

FIG. 2 is a side elevational view of the ball hitch connector hereof;

FIG. 3 is a cross-sectional view taken along line 3—3 of FIG. 2; and

FIG. 4 is a bottom plan view of the spherical body employed herein.

DETAILED DESCRIPTION OF THE PREFERRED EMBODIMENT

Referring now to the drawings, there is illustrated in FIG. 1 a ball hitch connector, generally, denoted at 10 in accordance with the principles of the present invention. The ball hitch connector 10 generally, comprises:

(a) a generally spherical body or ball or ball connector 12, an overall diameter D;

(b) a stud or shaft 14 which receives the spherical body;

(c) a collar 16 which surrounds the stud;

(d) a base plate 18 to receive the collar and stud;

(e) and a fastening means 20 to secure the stud 14 to the base plate 18.

The ball connector 10 is of the type adapted for connection to a conventional ball hitch socket (not shown) mounted conventionally on the torque or hitch (not shown) of a trailer or other vehicle to be towed (not shown).

More particularly, as shown in FIG. 4, the spherical body 12 has a first polygonal opening or bore 13 which receives the shaped upper end of the stud or shaft as subsequently detailed. The bore 13 extends radially inwardly from a bottom surface of the spherical body 12 and is adapted to receive the upper polygonally-shaped section of the stud 22 as detailed in FIG. 1. The spherical body has a second bore comprising a throughbore 15 formed therethrough and which is, generally, normal to and in communication with the first bore 13.

As hereinafter described the second bore of the spherical body 15 is positioned to align itself with a first bore of the stud 30 when the stud is inserted into the polygonal opening 13 of the spherical body 12 and the spherical body is positioned to align a first bore of the stud 30 with the second bore 15 of the spherical body.

As shown in FIG. 1, the elongated or shaft stud 14 has an upper portion or section 22 which is polygonal in shape. The polygonal shape of the section 22 is similar to that of the first opening 13 and is slightly smaller than the opening 13 to permit the section 22 to be inserted thereinto. As shown FIG. 1, the upper section 22 has an internally threaded longitudinal opening 23 formed therein. A ball 25 is adapted and dimensioned to seat within the opening 23, is shown in FIG. 3. A biasing means, such as a spring 27 is inserted into the opening 23 to normally bias the ball through the opening 23. A set screw 29 or similar fastener retains the ball and spring assembly in the opening 23.

The upper portion 22, also, includes a transverse throughbore 30 which communicates with the longitudinal opening 23. Thus, it is to be seen that the ball 25 normally projects into the throughbore 30, and as subsequently detailed cooperates with a latch pin 50 to define means for releasably retaining the stud 14 with the spherical body 12.

The middle section 24 of the stud 14 is integral with the upper section 22 and includes a transverse bore 32 which is offset from the first transverse bore 30. The bore 30 is used to secure the collar 16 to the stud 14 as subsequently detailed.

The lower section of the stud is, preferably, externally threaded to receive a fastening or closure means to secure the stud to the base plate 18.

The collar 16 is, generally, conical in shape and encircles the stud 14. The collar 16 comprises a narrow, generally cylindrical upper section 39 and a wider polygonal base section 40. The collar further comprises an inner, generally cylindrical surface 42 which fits around stud 14 about the middle section 24 thereof. The collar has a bore 38 extending inwardly from an outer surface of the polygonal base 40 and is in communication with the second bore 32 of the stud 14. The inner surface of the collar 42 receives the stud 14 with the bore 38 of the collar 16.

A latch pin 41 projects through the bores 32 and 38 to interconnect the collar 16 to the stud 14. The latch pin 41 is manually slidable into the bores 32 and 38 manually removable therefrom. A latch pin 50 having a medial circumferential groove 52 is used to secure the upper section 22 of the stud 14 to the spherical body 12. In accordance herewith, the upper section 22 is inserted into the opening 13 such that the bore 30 registers with the bore 15. Upon alignment of the bores the latch pin is inserted thereinto whereupon the pin acts against the force of the spring 27 to push ball up into the longitudinal bore 23 until the groove 52 aligns with the ball. When this occurs, the ball then seats within the groove 52 to lock the latch 50 in position. Manual pressure can release the latch pin 50 from the locked position.

The ball hitch apparatus also includes a base plate 18 having an inner cavity 44 of the same polygonal shape as the base 40 of the collar 16. The base plate receives the stud and attached collar as shown. A fastening means, such as a nut 20 and washer 21, is threadably mounted onto the lower end of the stud below the base plate, as shown. The stud is held in place on the base plate by means of the attached collar having the same polygonal configuration as the base plate.

The ball hitch apparatus of the present invention demonstrates numerous improvements over the prior art. First, the polygonal configuration of the upper section of the stud which corresponds to the polygonal configuration of the first bore of the spherical body provides enhanced stability for the ball-stud connection. In the event that the latch pin 50 shears, becomes loosened, or is lost from its position in the spherical body the head cannot rotate due to the polygonal configuration. Further, the polygonal configuration provides added stability, as it decreases rotational stress on the spherical body and prevents it from loosening from the stud. Additionally, the present invention provides an improvement over the prior art by the collar which encircles the stud, and wherein the polygonal base of the collar is secured in the corresponding base plate of the same configuration. The stud with attached collar is rotatable within the polygonal base plate. This is advantageous for the reason that the collar may show signs of wear after prolonged use, making the stud and collar unstable, whereupon the stud with attached collar may be rotated to a place which is not worn, to increase the life of the ball hitch apparatus.

Also, improved stability of the ball hitch apparatus is provided by the bore of the collar and the insertable latch pin which is enclosed within the base plate. The latch pin is secured in the transverse bore of the collar within the base plate and cannot loosen or fall out.

It is to be further appreciated that the polygonal configuration of the upper section 22 of the stud 14 corresponding to the polygonal configuration of the spherical body 13 provides an improved secure connection. Also, the polygonal configuration 40 of the collar 16 corresponding to the base plate 18 allows for incremental rotation of the components to minimize wear.

Having, thus, described the invention what is claimed is:

1. A ball hitch apparatus for use with a conventional ball hitch socket, comprising:
   (a) a spherical body having at least one polygonally shaped bore, and a throughbore which communicates with the polygonal bore;
   (b) a stud separable from the spherical body, comprising an upper, a middle, and a lower section, the upper section being polygonal in shape, and insertable into the polygonal bore of the spherical body, the upper section having a first transverse bore registrable with the throughbore of the spherical body, the middle section having a second transverse bore and the lower section being adapted to receive a fastening means;
   (c) a collar separable from the stud, mountable onto the stud about the middle section thereof, the collar comprising an upper section and an outer lower base section having a polygonal configuration and a transverse bore therein which registers with the second bore of the stud to receive a latch pin to secure the collar to the stud;
   (d) a base plate, attachable to a trailer hitch, having an inner cavity corresponding to the polygonal shape of the collar, which seats the collar and retains the latch pin within the collar; and
   (e) the fastening means cooperating with the stud to retain the collar in relationship to the base plate.

2. The apparatus of claim 1 further comprising a latch pin insertable through the throughbore bore of the spherical body and the first transverse bore of the stud for connecting the spherical body to the stud.

3. The apparatus of claim 1 wherein the polygonal shapes of the stud and corresponding complimentary spherical body comprise a hexagon.

4. The apparatus of claim 1 wherein the polygonal configuration of the collar and corresponding complimentary inner cavity of the base plate comprise a hexagon.

5. The apparatus of claim 1 wherein the stud further comprises the upper section having
   (a) an internal longitudinal opening;
   (b) a ball adapted to seat within the opening;
   (c) a biasing means to bias the ball through the opening; and
   (d) a retaining means to retain the ball and biasing means in the opening.

6. The apparatus of claim 5, wherein
   (a) the internal longitudinal opening is threaded;
   (b) the biasing means comprises a spring;
   (c) and the retaining means comprises a set screw.

7. The apparatus of claim 1 wherein the collar and attachable stud is insertable within the inner cavity of base plate.

8. The apparatus of claim 1 wherein the fastening means to secure the stud to the base plate comprises a nut.

9. A ball hitch apparatus adapted for use with a conventional ball-hitch socket, comprising:
   (a) a spherical body having at least one polygonally shaped bore and a throughbore which communicates with the polygonal bore, the throughbore receiving a latchpin;
   (b) a stud comprising an upper, a middle, and a lower section, the upper section being polygonal in shape, and insertable into the polygonal bore of the spherical body, the upper section having a first transverse bore registrable with the throughbore of the spherical body, for receipt of the latchpin, and having an internal longitudinal opening to receive a ball adapted to seat within the opening, a biasing means to bias the ball through the opening and a retaining means to retain the ball and biasing means in the opening; the middle section having a second transverse bore and the lower section being adapted to receive a fastening means;
   (c) a collar mountable onto the stud about the middle section thereof, the collar comprising an upper section and an outer, lower, hexagonally shaped base section, the lower base section having a transverse bore formed therein, which registers with the second bore of the stud to receive a latchpin to secure the collar to the stud;
   (d) a base plate, attachable to a trailer hitch, having an inner cavity shape corresponding to the hexagonal shape of the collar which seats the collar and retains the latch pin within the collar;
   (e) the fastening means cooperating with the stud to retain the collar in relationship to the base plate.

10. The apparatus of claim 9 wherein:
    (a) the internal longitudinal opening is threaded;
    (b) the biasing means comprises a spring; and
    (c) the retaining means comprises a set screw.

* * * * *

UNITED STATES PATENT OFFICE
CERTIFICATE OF CORRECTION

Patent No 4,938,496　　　　　　　　　　Dated　　July 3, 1990

Inventor(s)　　Thomas et al.

It is certified that error appears in the above-identified patent and that said Letters Patent is hereby corrected as shown below:

Col. 2, line 36, after "which" delete "enclosures" insert --encloses--.

Col. 2, line 44, after "base of the" delete "color" insert --collar--.

Signed and Sealed this

Seventeenth Day of September, 1991

Attest:

HARRY F. MANBECK, JR.

*Attesting Officer*　　　　*Commissioner of Patents and Trademarks*